United States Patent [19]
Datwyler et al.

[11] Patent Number: 5,444,860
[45] Date of Patent: Aug. 22, 1995

[54] TRANSLATOR SYSTEM FOR MESSAGE TRANSFERS BETWEEN DIGITAL UNITS OPERATING ON DIFFERENT MESSAGE PROTOCOLS AND DIFFERENT CLOCK RATES

[75] Inventors: Wayne C. Datwyler; Paul B. Ricci, both of Laguna Niguel, Calif.

[73] Assignee: Unisys Corporation, Blue Bell, Pa.

[21] Appl. No.: 837,174

[22] Filed: Feb. 14, 1992

[51] Int. Cl.⁶ .................................................. G06F 5/06
[52] U.S. Cl. .................................... 395/500; 395/250; 364/239.1; 364/DIG. 1
[58] Field of Search ............... 395/200, 250, 275, 325, 395/500, 800

[56] References Cited

U.S. PATENT DOCUMENTS

| | | | |
|---|---|---|---|
| 4,527,233 | 7/1985 | Ambrosius, III et al. | 395/250 |
| 4,604,683 | 8/1986 | Russ et al. | 395/325 |
| 5,121,390 | 6/1992 | Farrell et al. | 370/94.1 |
| 5,133,078 | 7/1992 | Minassian et al. | 395/800 |
| 5,239,662 | 8/1993 | Danielson et al. | 395/800 |

*Primary Examiner*—William M. Treat
*Attorney, Agent, or Firm*—Alfred W. Kozak; Mark T. Starr

[57] ABSTRACT

A message transfer system between digital modules where two or more digital modules operate on separate and different message lengths and clock frequencies and where, temporary storage buffer (translator unit) holds messages being transferred between the different digital modules and acts as a speed matching and word length matching buffer unit to permit compatible transfer of message words. Also, the transfer system recognizes when requests are outstanding from both digital modules and can discard a message from a requesting module. Each of the two or more separate digital modules is serviced by dual system busses providing for redundancy of data transfer operations.

3 Claims, 9 Drawing Sheets

| FIG. 3A | FIG. 3B |

TRANSLATOR SYSTEM FOR MESSAGE TRANSFERS BETWEEN DIGITAL UNITS OPERATING ON DIFFERENT MESSAGE PROTOCOLS AND DIFFERENT CLOCK RATES

FIELD OF THE INVENTION

This disclosure involves computer systems and networks involving digital modules wherein one module which functions to read and write in a single word sequences must communicate with other digital modules operating with multiple word sequences per unit time, and the operating clock times may vary in the different modules.

BACKGROUND OF THE INVENTION

It is quite commonly found that some types of digital modules in a certain type of operating system will function to operate using, for example, a single word at a time, that is to say, the system is capable of reading one word or writing one word or processing one word in a unit time cycle of the particular system.

Likewise, there are other systems which operate on different type protocol operations such as, for example, systems which have digital modules which operate, for example, with the use of four word data bursts, that is to say, words are read in groups of four words or written in groups of four words or transferred in groups of four words.

The problem and difficulty arises when it is desired that digital modules of the first type of system (System A) are to be used in conjunction with digital modules of the second type of system (System B) in order to make them operate compatibly.

As a concrete example, the Unisys A16 system provides an architecture using a task control unit or TCU which communicates with other digital modules within its system using four word data bursts. Likewise, the input/output unit of the Unisys A16 system also has digital modules which communicate with four word messages.

Now when digital modules, such as the 4 word message protocol type, are desired to be integrated into a system where a different type processor is used, such as, for example, a processor which is able to read and write messages only one data word at a time, it presents numerous difficulties. In order to provide compatibility between a single word protocol processor, which in the example cited herein, could be designated as the IMP processor (Integrated Mainframe Processor) and a 4-word protocol digital system, certain accommodating translation mechanisms must be developed. This IMP processor has only the capability to read and write messages one data word at a time, but it was needful to develop a process to permit communication between the IMP processor and the previously known Unisys A16 digital modules designated as the Task Control Unit (TCU) and the Input/Output Unit (IOU) which required messages having four word quantities.

The present disclosure provides a translator means to permit four word request and acknowledgement messages to be exchanged between a Unisys IMP processor and other digital modules such as a Task Control Unit or an Input/Output Unit which are integrated into the processor's system, even though the word protocols are different and the clock rates of the digital modules are different.

SUMMARY OF THE INVENTION

The present invention provides a message passing interface between one type of digital module which operates using single word messages and a first clock rate in order to integrate this module with other modules which operate on multiple word message systems using a second clock rate. The present invention provides a process to allow communication between such varied types of digital modules wherein a developed logic is provided and implemented in a unit designated as the Translator Buffer Unit. Dual duplicate system busses implement data transfer bus redundancy between the Translator Buffer Unit and external resource modules.

A first digital module such as a processor, and one or more other (second) digital modules, such as on I/O Unit (IOU) or Task Control Unit (TCU), are interconnected by means of a Translator Buffer Unit which enables the transfer of message data between these modules even though the processor (first digital module) reads and writes messages of one word length (n) per each clock cycle while the other digital modules (IOU and TCU) operate with multiple word length messages (M×n) handled at the rate of one word length for each clock cycle, which may be of a different frequency rate.

The Translator Buffer Unit provides a RAM memory unit to hold a specified number of outstanding messages. A programmable counter unit in the Translator Buffer Unit is used to address individual words in the RAM memory unit.

A Translator Controller Unit provides 3 programmed state machines to regulate message transfers. These state machines regulate message transfers:

(a) from the first digital module (IMP Processor) to the RAM memory (SENDS);

(b) from the RAM memory to the first digital module, (IMP) (READS) and;

(c) from said second digital module (IOU/TCU) to the RAM memory (MSGIN).

Thus the Translator Buffer Unit provides for compatibility of message transfers between the digital modules of two different systems even though the clock rates are different and the message handling protocols are different.

Additionally, the translator system enables differentiation between types of messages to indicate their source (sender) and whether the message was a "Request" or an "Acknowledge".

BRIEF DESCRIPTION OF THE DRAWINGS

FIG. 3, as depicted in FIGS. 3A and 3B, is a more detailed diagram of the translator buffer unit indicated in FIG. 1A;

FIG. 6 is a schematic diagram showing the process involved in the translator buffer unit state machine for the function of taking a message in.

GENERAL OVERVIEW

The situation presented here involves the operating conditions where two separate systems are incompatible with each other in the normal sense, but can be made compatible with each other by the use of an intermediary unit called the translator buffer unit.

As a concrete example, if a processor system A functions at a 12 Megahertz clock speed and operates to read and write data words which may be 48 bits in length, on the basis of being able to send and receive only one 48 bit word per message transmission cycle which is regulated at the 12 Megahertz rate, and then a second system B functioning at a 16 Megahertz rate and operating to send and receive message words of four X48 bits per message transmission cycle, that is to say, the system B handles four of the 48 bit words per message transmission cycle at 16 Megahertz, then it can be observed that there is a basic incompatibility between the two systems from the standpoint of networking them in order to have them cooperate with each other.

Thus, there are three basic problems which arise in this situation when the system A and the system B are to be connected for compatibility. The first problem is:

(a) the difference in system clock timing since system A operates at 12 Megahertz and system B operates at 16 Megahertz.

(b) the second problem involves the size of the messages handled by system A and system B whereby system A processes and handles only one 48 bit word (sends/receives) in its operating clock time, while in system B the digital modules handle (send/receive) four X-48 bits (four words) in its clock time at 16 Megahertz. Thus, the bit handling capacity of one system is incompatible with the bit handling capacity of the other system in any given unit of time.

(c) The problem of recognition of the Source (sender) of a message and its type; i.e. whether it is a Request or an Acknowledge. This enables System A (IMP) to load each type into specific locations within its storage RAM 20. This also enables System A to be able to determine whether a particular incoming Request message from System B (IOU/TCU) should be discarded when System A already has an outstanding request to System B, since System A messages are given priority.

These incompatibilities are handled by the use of the herein-described translator buffer unit which acts as an interface buffer permitting the system A processor (IMP) to both send and receive messages to and from the translator buffer unit at its compatible rate of one 48 bit word per clock of its 12 Megahertz clock time and, additionally, the translator buffer unit permits the external system resources, such as the I/O unit and Task Control Unit to send and receive messages to and from the translator buffer unit at its own compatible length of four 48 bit words (192 bits) at its normal rate based on its 16 Megahertz clock rate.

Thus, the situation of incompatibility of systems has been transformed into a situation where the systems can operate compatibly and the capabilities and resources of one system are available to the capabilities and resources of the other system.

Figure 2:
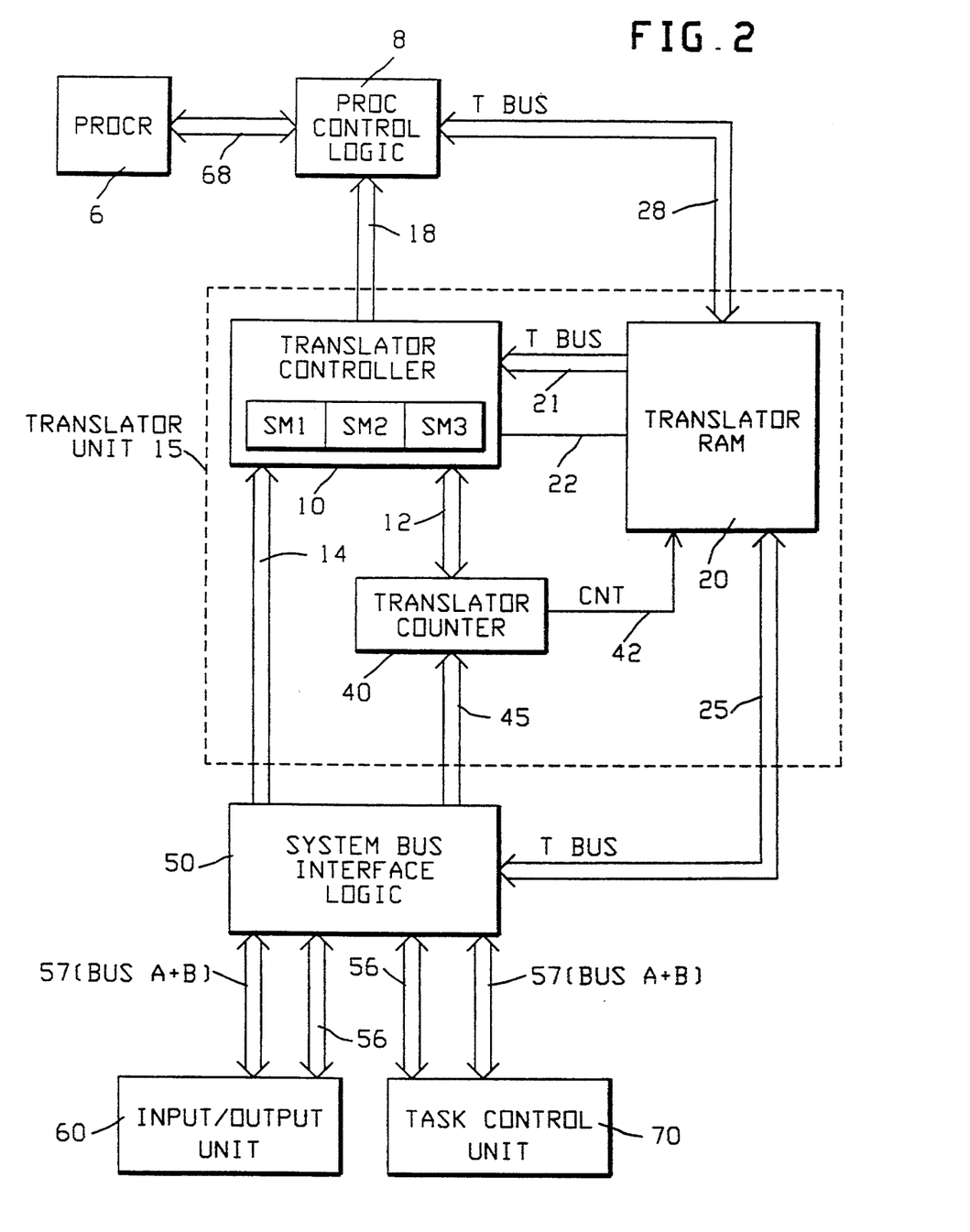
FIG. 2 is a more detailed diagram of the system for providing communication with different digital modules using different types of message handling protocols and capabilities.

The translator buffer unit 15 described herein will be seen in FIG. 2 to provide a translator controller 10 having three State Machines, SM1, SM2 and SM3, included therein for the purposes of: (1) to allow the RAM memory 20 in the translator unit 15 to accept message words sent by the IMP processor 6; (2) logic to permit the IMP processor 6 to read messages one word at a time from the RAM memory 20 in the translator unit 15; and (3) provide the logic whereby messages from the external units 60, 70 connected to the system bus may be accepted and written into the RAM memory 20 of the translator unit 15.

Thus, the state machines in the translator unit controller 10 provide for the transitions whereby the IMP processor 6 can receive or send single 48 bit words at its 12 Megahertz rate and, at the same time, the external resources, such as the IOU 60 and TCU 70 can send and receive messages to and from the translator unit 15 at the four word burst rate and at a compatible clock of 16 Megahertz.

On the recognition of the "type" of message and source of message, the system looks at two special bits in the 48 bit word such that: the value of 1 bit position will indicate whether the message is a "Request" or an "Acknowledge"; another bit position value will indicate the source (sender) of the message.

Figure 1A:
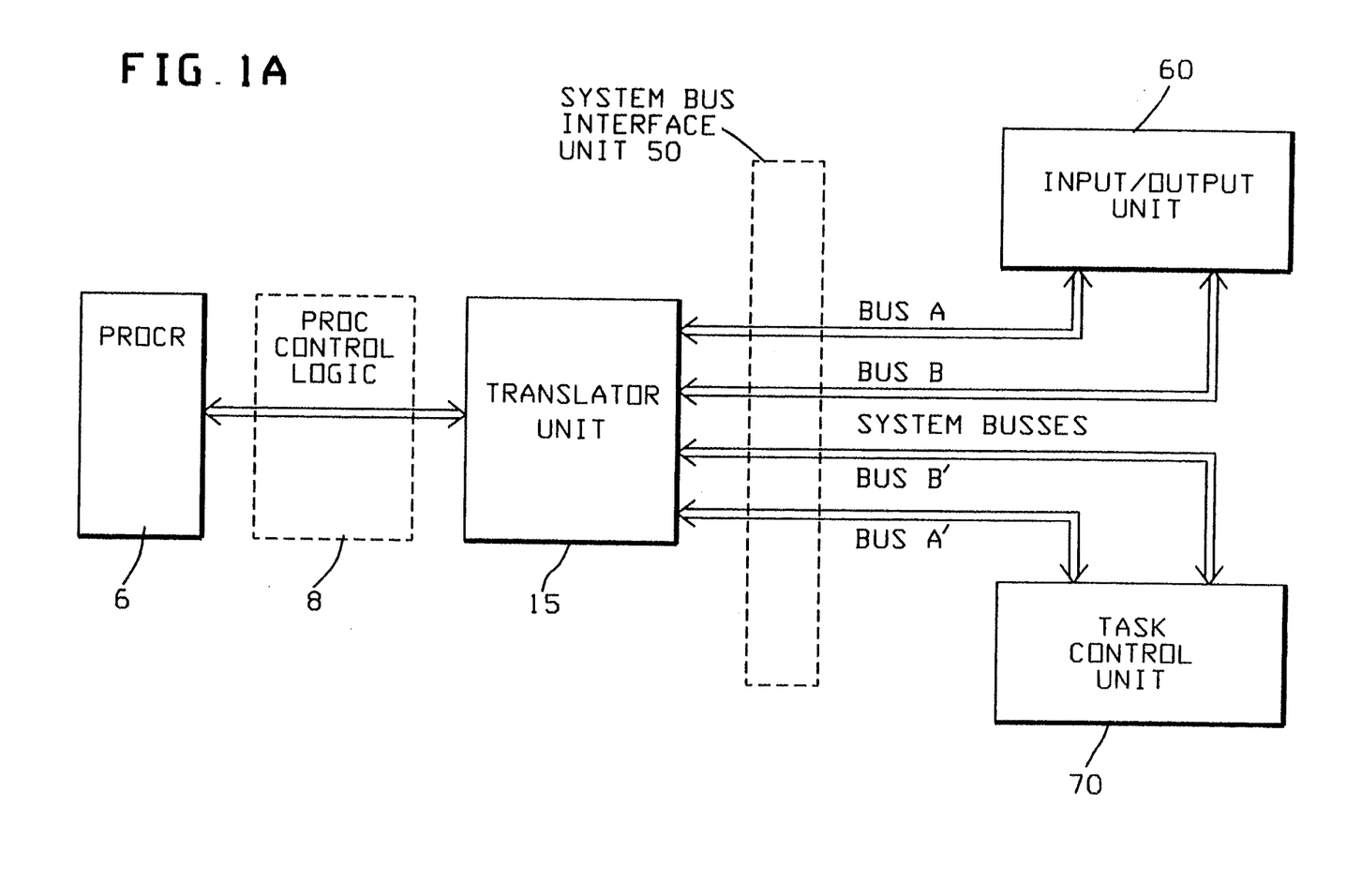
FIG. 1A is a block diagram showing the relationship between a digital module such as processor (IMP) which is in communication with an input/output unit and task control unit having different word message capabilities.
Figure 1B:
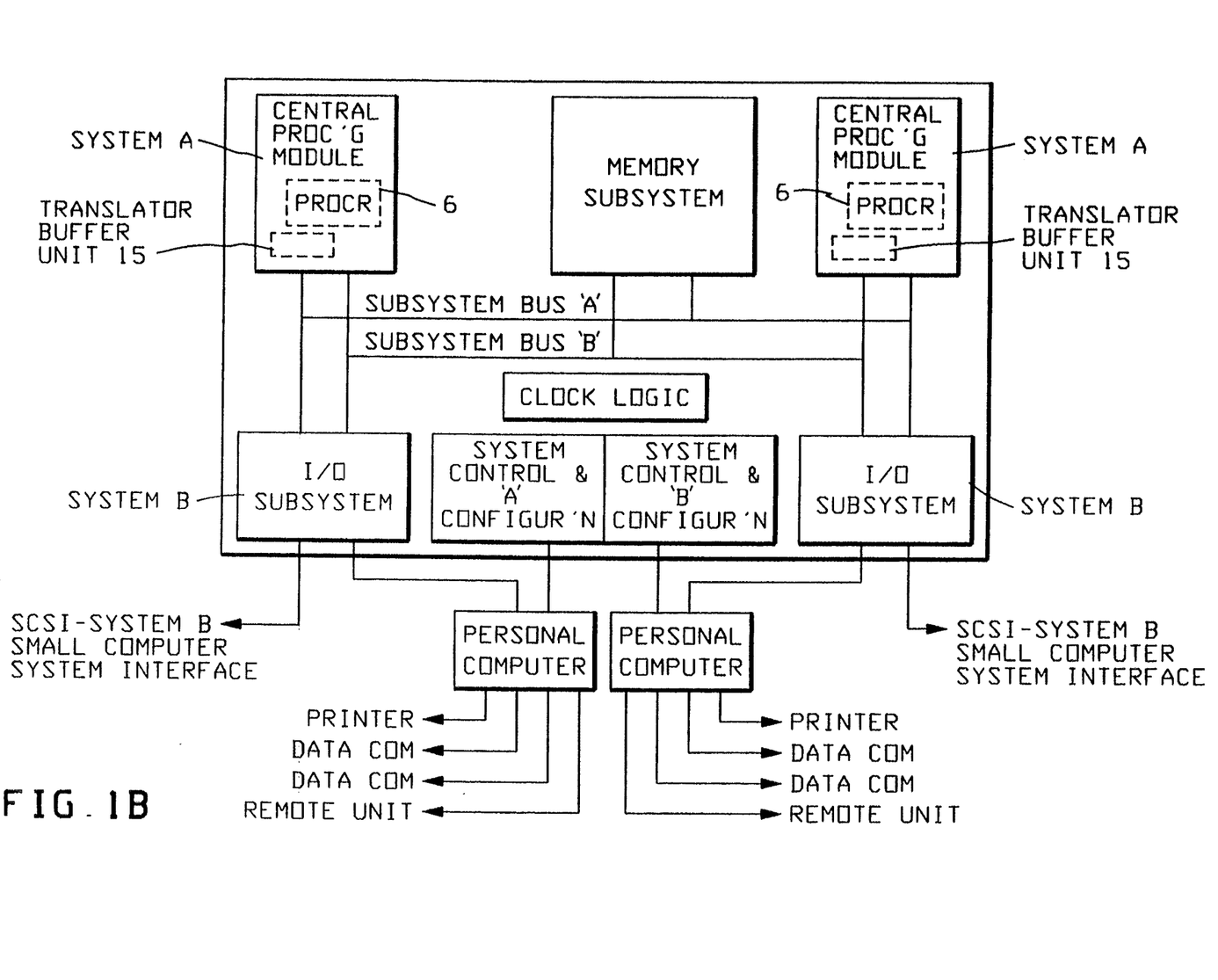
FIG. 1B is a block diagram showing the general environment in which the unitary word IMP processor operates in conjunction with an associated I/O subsystem using a multiple word protocol.
Figure 1C:
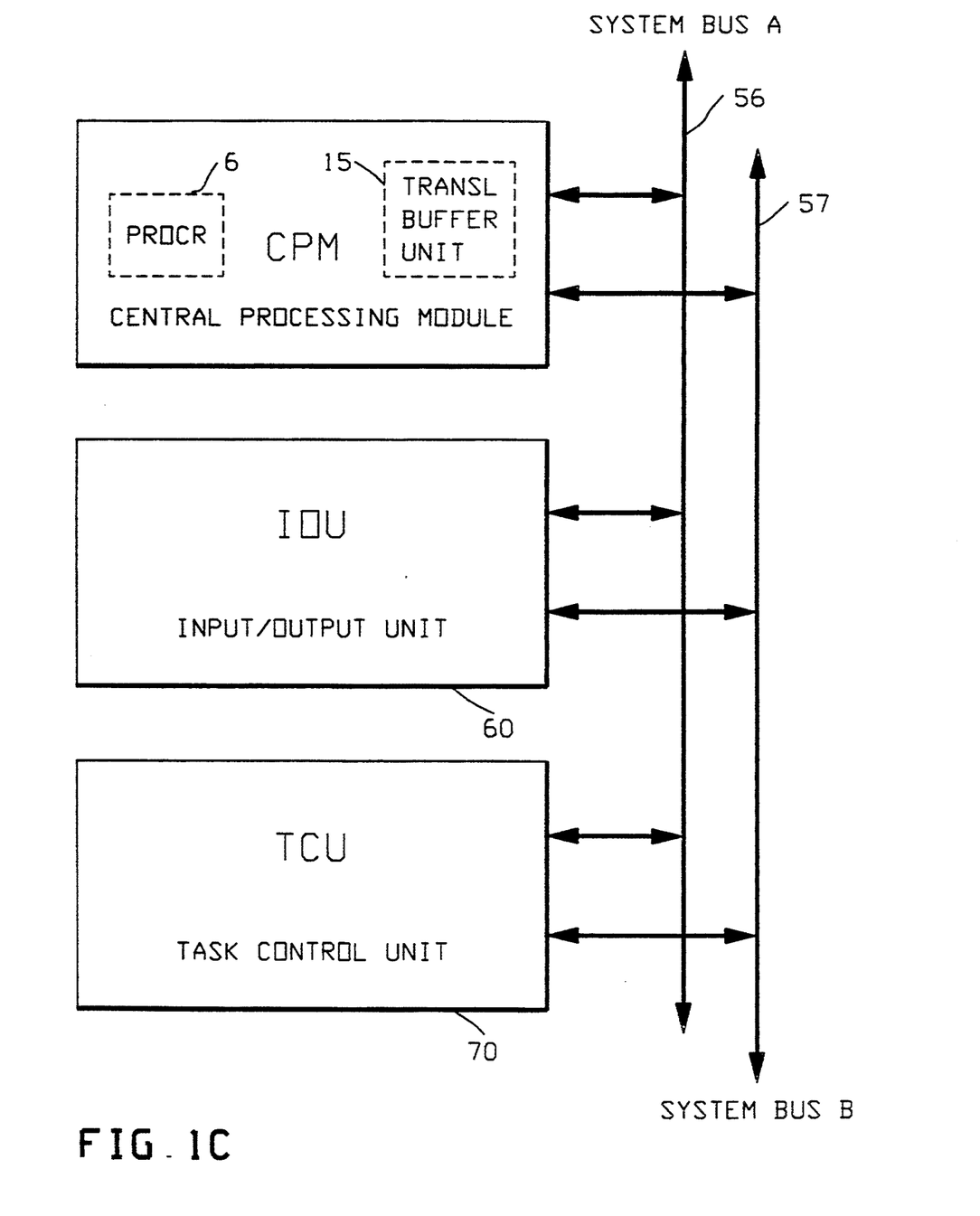
FIG. 1C is a generalized diagram of the system network environment.

Referring to FIG. 1B, there is seen a generalized block diagram of a networking environment of Unisys A series computer systems. Here the two CPM's are central processor modules which may involve the previously mentioned IMP processor which can read and write or handle only one word on a message cycle. Likewise, the elements shown and designated as the Network Environment involve the use of words in the memory subsystem which can be accessed only one word at a time in order to work compatibly with the CPM's (IMP processors).

However, the indicated "I/O subsystems" of this architecture involve digital modules which work on quite a different system basis, that is to say, they operate using bursts of four words per message cycle.

Thus, in order to integrate and make compatible the first type of IMP central processor modules with the different I/O subsystem modules, it was found necessary to develop a message passing interface system such as that Translator Unit 15 shown in FIG. 1A. Here, the single word function operation of processor 6 must be made compatible with the multiple word function operation of units 60 and 70 (FIG. 1A). This, as seen in FIG. 1A, is accomplished by the Translator Unit 15 which is shown in more detail in FIG. 2.

DESCRIPTION OF PREFERRED EMBODIMENT

As seen in the generalized block diagram of FIG. 1A, processor 6 is connected through processor control logic 8 to a Translator Unit 15. The Translator Unit 15 connects to a system bus interface unit 50 which separates through two buses into a Input/Output Unit 60 and a Task Control Unit 70 (which controls which tasks a processor will work on).

The translation system is shown in greater detail in the block diagram of FIG. 2 wherein a processor 6, which may, for example, have the capability of single word handling, is connected via processor control logic 8 to the translator unit 15.

Within the translator unit 15 is a translator controller 10 which connects to the processor control logic 8 and also receives data from the translator RAM 20. Similarly, the translator controller 10 receives data from the translator counter 40 and from the system bus interface logic 50 by means of the bus 14.

The system bus interface logic 50 has provision for two (A+B) system buses 56 and 57 which connect to the Input/Output Unit 60 and the Task Control Unit 70. Further, the system bus interface logic provides, via bus 45, information to the translator counter 40, and, via bus 14, provides information to the translator controller 10. The translator bus 25 provides communication between the translator RAM 20 and the system bus interface logic 50. Likewise, the translator bus 28 provides intercommunication between the translator RAM 20 and the processor control logic 8.

With respect to the Translator Unit 15 of FIG. 2, this unit will store a series of messages which are shown as indicated herein below:
 (a) Requests to TCU
 (b) Acknowledges to TCU
 (c) Requests to the IOU
 (d) Requests from the TCU
 (e) Acknowledges from the TCU
 (f) Acknowledges from the IOU In FIG. 3, the details of the buses involved are shown with more definition. Bus 18 indicates the various types of signals functioning between the control logic 8 and the translator controller 10.

Figures 3, 3B:
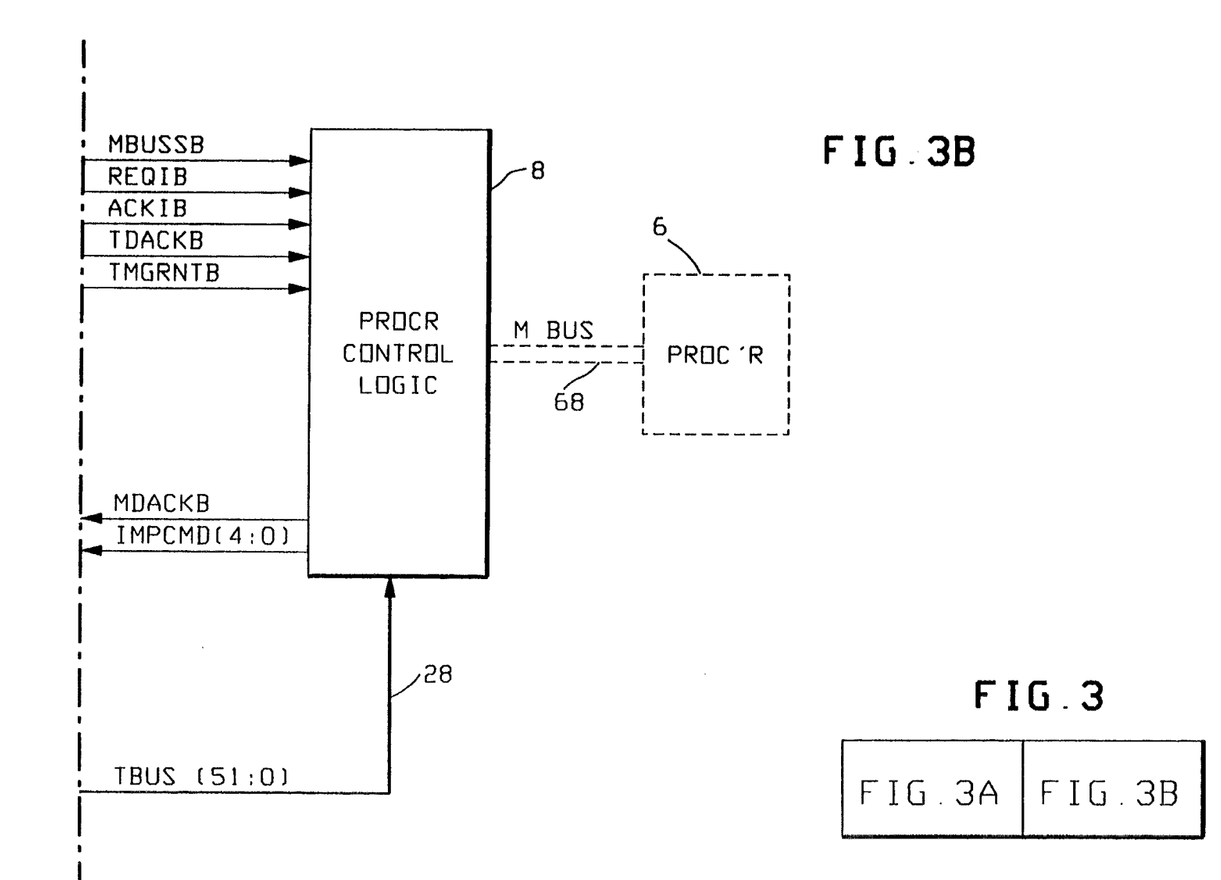
Figure 3A:
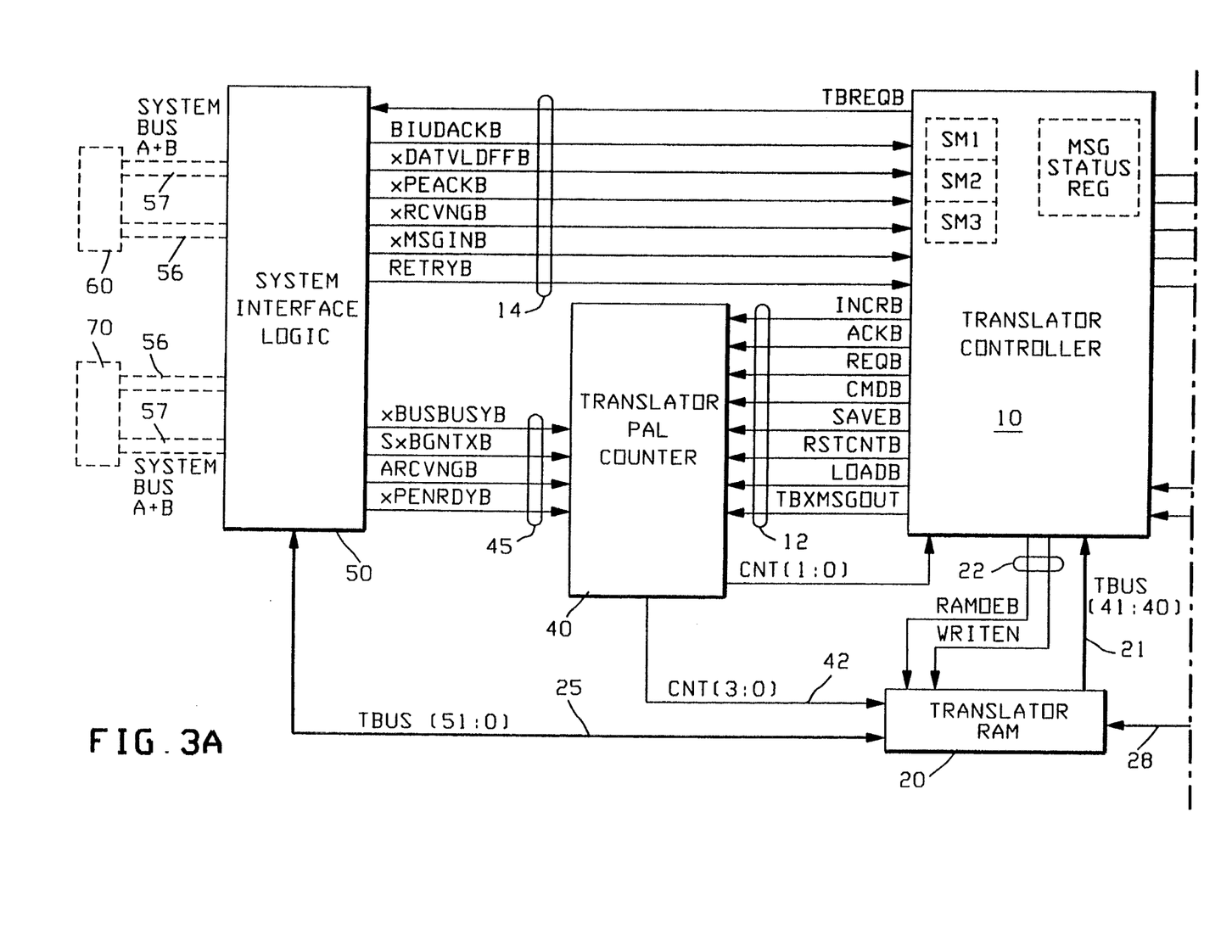

Thus, in FIG. 3 the bus 18 shows the particular signals between the control logic 8 and the translator controller 10. The bus 12 shows the detailed individual signals between the translator controller 10 and the translator counter 40.

The bus 14 shows the detailed signals between the translator controller 10 and the system interface logic 50. Likewise, the bus 22 shows signals between the translator controller 10 and the translator RAM 20. The outputs of the translator RAM 20 are shown on bus 21 being conveyed to the translator controller 10.

Referring to FIG. 2, the translator unit 15 is a temporary storage buffer for holding interprocessor communication messages prior to being transferred and after being received on the system buses 56 and 57.

The system buses 56 and 57 operate for message transfer in four word blocks at 16 MHz. The data for these messages can be transferred at a maximum rate of one word for every clock. The processor 6 (IMP) reads or writes these messages one word per bus cycle over its translator unit interface 15. The translator unit 15 serves as a speed matching buffer between the system bus interface logic 50 and the processor control logic 8.

In the presently described system, the messages are of three types: (i) external calls; (ii) external requests; and (iii) acknowledgements.

"External calls" are request messages from the central processing module (IMP) to other system modules such as the Input/Output Unit 60 or Task Control Unit 70. External calls are only transmitted by the central processing module such as processor 6 and are not received by the processor 6.

"External requests" are requests to the processor 6 (CPM) from the Task Control Unit 70 and the Task Control Unit, which will then receive an acknowledgement when the processor 6 accepts the request. External requests are only received by the processor 6 and are not transmitted by this processor.

The "Request" operations consist of two types which are:
 (i) External Calls—requests by the CPM processor 6 to other modules;
 (ii) External Requests—requests by the TCU 70 to the CPM processor 6.

"Acknowledgment" messages are responses from other system modules (as I/O unit 60 and TCU 70) to previously sent requests. Acknowledgements can be transmitted by or received by the processor 6 (CPM). The translator controller 10 is able to hold a maximum of three outstanding messages at any one time: (a) one incoming acknowledgement; (b) one incoming request; and, (c) one outgoing message.

In order to address the individual words within the message buffer section which is shown as the translator RAM 20, the translator unit 15 contains a four bit counter 40. The logic of the translator counter 40 is implemented in a Signetics PLUS 405 device called the translator counterprogrammable array logic (PAL). This counter is incremented as words of a message are transferred out of or into the translator unit 15.

Request messages and acknowledge messages received by the translator unit 15 cause interrupts to be generated to the IMP processor 6. Request messages result in an interoperator interrupt to the IMP processor 6, while on the other hand, acknowledgement messages result in an immediate interrupt. The acknowledgement interrupt is monitored by IMP microcode because after the IMP processor has sent an external call (while it is waiting for an acknowledgement), it is in a state of idleness.

The Unisys A series computers operate on a internal program called the Master Control Program or MCP, as does the Unisys A16 series I/O Subsystem. Each of the A series processors and subsystems require the imposition of a set of protocol rules on the message transfer for operation of the translator unit 15. The translator unit 15 will store both requests and acknowledgements to the Task Control Unit (TCU) 70; it will also store requests "to" the Input/Output Unit (IOU) 60; the translator unit 15 will store requests and acknowledgements "from" the Task Control Unit 70 and also acknowledgements "from" the IOU 60.

However, requests received by the processor 6 from TCU 70, while an external call from the IMP processor 6 to TCU 70 is being accumulated by the translator unit 15 or is currently outstanding to the task control unit (TCU) 70, will be "discarded".

Since a discarded request message may already have generated an interrupt to the IMP processor 6, the translator unit 15 will maintain a "Message Status Register" (FIG. 3) with a "discard" bit to notify the IMP processor 6 of this condition.

When the IMP processor 6 receives a request interrupt, it will then first read the Message Status Register to determine if the request has been discarded.

The translator unit 15, FIG. 2, will interface to both the IMP processor 6 and the system bus interface logic 50 and will be capable of accepting transfers at the 12 MHz processor frequency or also at the 16 MHz bus frequency.

The translator controller 10 shown in FIGS. 2 and 3 provide a series of signals and operations for this system which are listed as follows:

FIG. 3 shows a block diagram of the translator unit logic and the signals which interface between the modules. The translator controller 10 carries out the following signal operations:

Send External Request (SND_EXT): This command from the IMP processor 6 causes the translator unit 15 to load a request message word into the next location of the output buffer, RAM 20.

Send Acknowledge (SND_ACK): This command from the IMP processor 6 causes the Translator Unit 15 to load an acknowledge message word into the next location of the output buffer, RAM 20.

Read Request (RCV_REQ): This command from the IMP processor 6 causes the translator unit 15 to send the next word from the request buffer in RAM 20 to the IMP processor 6.

Read Acknowledge (RCV_ACK): This command from the IMP processor 6 causes the translator unit 15 to send the next word from the acknowledge buffer in RAM 20 to the IMP processor 6.

Send Interprocessor Message (IPC_CMD): This command from the IMP processor 6 causes the translator unit 15 to load the outgoing command word into the command buffer in RAM 20. The translator unit 15 then makes a request to the system bus interface for access to send a message. Once permission has been received, the translator unit 15 will start sending the command and four message words to the system bus interface, 50.

Read Status (RCA_STA): This command from the IMP processor 6 causes the translator unit 15 to send the "discard bit" status to the IMP processor 6. If the discard bit is "one", this indicates that the pending request message need not be read. If it is zero, the pending request message is "valid" and should be read.

Within the elements of FIG. 3, the following designated signal lines provide the functions indicated hereunder:

IMP Encoded Command IMP_CMD (4:0): This command field indicates to the translator controller 10 the current IMP operation.

Data Valid Flip-Flop (A_DATVKD-FF_B_DATVLDFF-_B): These flip-flops indicate that valid message data is being received from one of the two system buses (56, 57) by the system bus interface logic 50. These signals are used by the translator controller 10 to determine when a message has been completely received from a system bus (56, 57).

Translator Bus T_BUS (41:40): These two bits are used to determine whether the request message word the IMP is sending has the TCU as a destination. If T_BUS(41:40)=10, the discard bit is set, indicating that any subsequent request message received before an acknowledge for the outstanding IMP request will be discarded. They are used with CNT1 and CNT0 as explained below.

Message Word Count (CNT1,CNT0): These bits from the translator counter 40 are used along with T_BUS(41:40) to set the discard bit only when the first message word is sent to the translator unit 15 from the IMP. The first message word is the only one with destination data. Both CNT1 and CNT0 must be zero.

Incoming Message (A_MSGIN_B,B_MSGIN_B): These signals from the system bus interface 50 indicate that a valid message bound for the host module will be loaded from the indicated system bus beginning the clock after the signal becomes active. It is used by the translator controller 10 to transition the MSGIN state machine and setup the RAM 20 to the proper address to receive message data.

Receiving Incoming Message (A_RCVNG_B,-B_RCV-NG_B): These signals from the system bus 50 interface indicate that a valid message is being loaded from the system bus. The translator unit 15 uses these signals to determine when the message has finished loading from the system bus.

Input Register Bit 47 (RA_BIT47,RB_BIT47): These signals from the system bus interface 50 are used to determine whether the incoming message on the indicated bus (56 or 57) is an "acknowledge" or "request" message. If the bit is one, it is an acknowledge message, while a zero indicates a request message.

Processing Element Acknowledge (A_PEACK-_B,B-_PEACK_B): These signals from the system bus interface indicate that the message has been successfully received without errors. When one of these signals become active, an interrupt is sent to the IMP processor 6 to indicate a new message is valid in the translator unit 15 and should be read.

IMP Data Acknowledge (M_DACK_B): This signal from the IMP interface control logic indicates that message data has been received from the translator unit 15 during a "read" operation.

Bus Interface Data Acknowledge (BIU_DACK_B): This signal indicates that the system bus interface logic 50 has finished sending a complete message. When the controller 10 logic has seen this signal, the translator unit 15 will stop sending message words.

Discard Bit M_BUS(39): When the IMP 6 does a RCA_STA command, the status information will be returned on this bit. If it is high, the request message can be discarded, while low indicates it must be read.

Retry Operation (T_RETRY_B): This signal from the system bus interface 50 tells the translator unit 15 that an error occurred sending the message and should be retried at a later time. The translator unit 15 will try to send the message again after this signal has gone inactive.

A series of signal interconnections are provided between the translator controller 10, RAM 20 and the IMP processor 6:

RAM Output Enable (RAMOE_B): This signal causes the RAM 20 to drive data onto the T_BUS 28. It becomes active when the IMP processor 6 is reading message data from the translator unit 15 or when the translator unit 15 is sending message data to the system bus interface, 50.

Request Interrupt (REQI_B): This signal is active for one or two clocks, depending on synchronization, to tell the IMP processor 6 that a new request message is pending in the translator controller 10.

Acknowledge Interrupt (ACKI_B): This signal is active until the first acknowledge message word is read by the IMP. It tells the IMP that a new acknowledge message is pending in the translator controller 10.

Translator IMP Grant (T_MGRNT_B): This signal is used when the IMP processor 6 is writing message words to the IMP. Once a command has been sent by the IMP to the translator controller 6, this signal is used to indicate that the data phase of the write can be sent.

Translator Data Acknowledge (T_DACK_B): This signal tells the IMP processor 6 that valid data is being sent to it when doing a read, or that a message word has been correctly received when the IMP processor 6 has received it.

Translator System Bus Request (T_BREQ_B): This signal is sent to the system bus interface 50 to make a request to send a command and four word message to another system module.

Write Translator RAM (WRITEN): This signal causes data to be written into the RAM 20 at the address set by the translator counter 40. It is active when the IMP processor 6 is writing message data to the translator controller 10 or when a message is being received from the system bus interface, 50.

Figure 4:
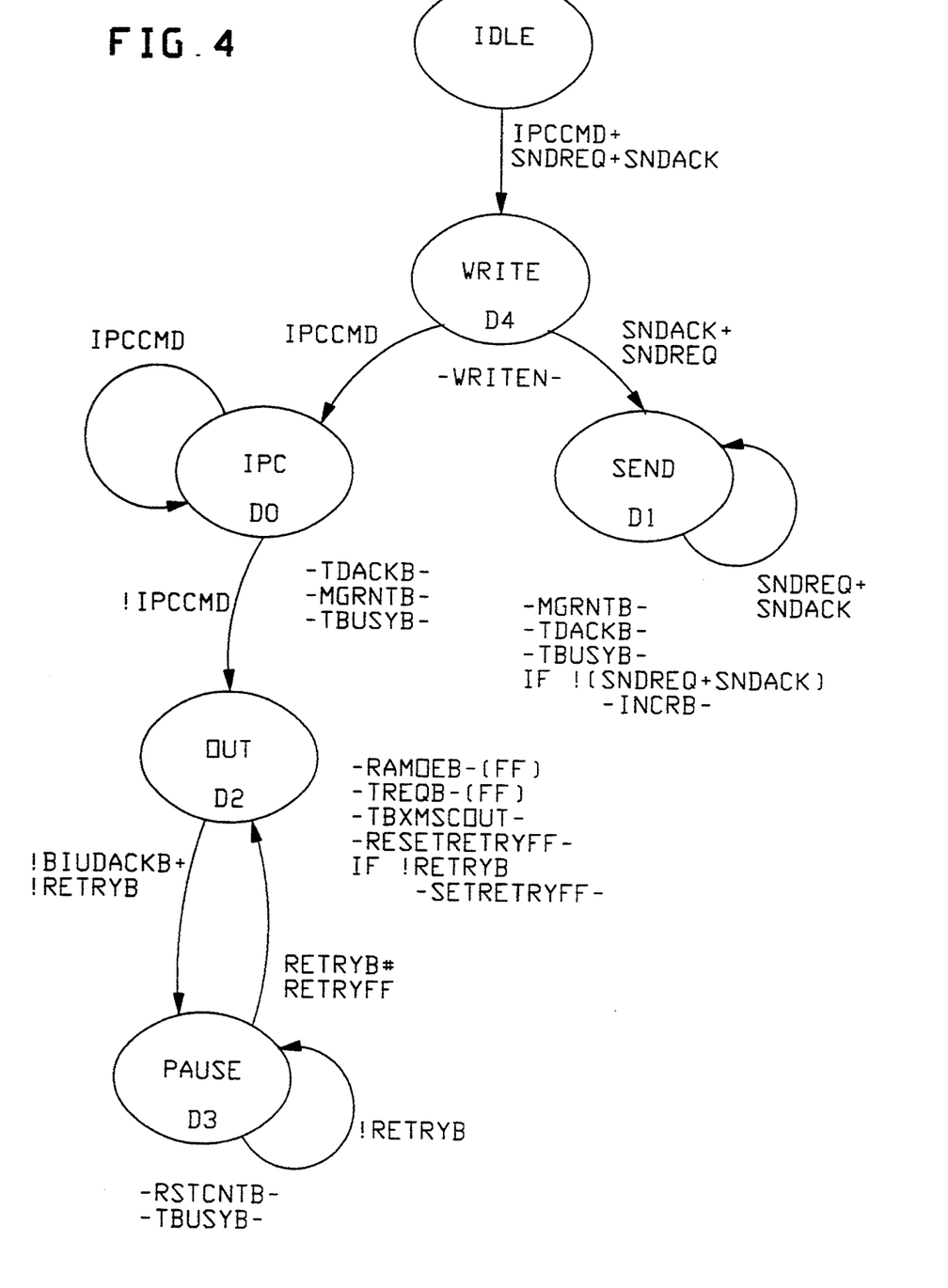
FIG. 4 is a schematic drawing showing the operation of the translator buffer unit in its state machine operation for sending a message.

As indicated in FIGS. 2 and 3, there are three independent state machines (SM1, SM2, SM3) located in translator controller 10. These provide:
 (i) SM1—SENDS functions (FIG. 4);
 (ii) READS functions (SM2) in FIG. 5; and
 (iii) SM3—MSGIN—(message in) (FIG. 6).

The SENDS state machine, SM1, implements the logic to accept message words sent by the IMP processor 6 to be stored in the translator RAM 20. It operates in six states. FIG. 4 illustrates the state machine functions.

FIG. 4 shows a schematic flow diagram of the functions involved in the Sends state machine, SM1. Referring to FIG. 4, the IDLE is a state entered by the state machine when the translator controller 10 is reset and at the end of each operation.

The WRITE function designated D4 operates such that if a message word is sent to the translator controller 10 by the IMP processor 6 with the commands SND_RET, SND_ACK, or IPC_CMB, then this "write" state will be entered. WRITEN becomes active in order to write the data into the translator RAM 20.

The interprocessor command state (IPC) designated in block DO is a state for the interprocessor command word which has been written into the translator RAM 20 and the state machine is issuing T_DACK_B and T_MGRNT_B to the IMP processor 6 to indicate it has received a command word.

The OUT state shown as D2 in FIG. 4 indicates that during this state the command and message words are being sent to the system bus interface logic 50 and also to the destination module, such as, I/O unit 60 or Task Control Unit 70. This signal T_BREQB is active to make a request to the system bus interface logic 50 for access to a system bus. The signal RAMOE_B is active to output enable the RAM 20. The signal TBXMSG_OUT is active to indicate to the translator counter 40 (programmable array logic) that a message is being sent out. The internal flip-flop RETRYFF is reset in this state. If the signal T_RETRY_B becomes active, indicating the message should be retried at a later time, then the signal RETRYFF will be set during the transition period.

The block designated D3 as PAUSE is the final state after a message has been sent out or a retry of the operation is required. The signal RSTCNT_B is active to reset the translator counter 40 back to an address of zero. The state machine SM1 will remain in a state as long as T_RETRY_B is active.

In FIG. 4 the designated area D1 marked SEND is a state which is entered during a SND_REQ or a SND_ACK command with the IMP processor 6 writing one word to the RAM 20. This state indicates that the word has been written into the RAM 20 and the state machine (SM1) is issuing the signals T_DACK_B and also T_MGRNT_B to the IMP processor 6 to indicate it has received the command word. It will also activate the signal INCR_B to increment the translator counter programmable array logic 40 to the next RAM 20 address.

SENDS State Transitions:

IDLE to WRITE: This transition will occur at the beginning of a SND_REQ, SND_ACK, or IMP_CMD operation.

WRITE to IPC: Write is a one clock state, and if the command was IPC_CMD, this transition will be made.

IMP to OUT: The state machine will stay in the IPC state until the IPC_CMD signal becomes inactive indicating that the IMP logic has seen T_DACK_B. This transition will then be made to start sending the completed message word to a system bus.

OUT to PAUSE: The state machine will stay in this state until the message has been successfully sent indicated by BIU_-DACK_B becoming active, or T_RETRY_B becoming active indicating the operation needs to be retried at a later time when T_RETRY_B becomes inactive. Either of these cases cause the transition to be made.

PAUSE to OUT: This transition is made when T_RETRY_B goes inactive indicating that the state machine can proceed with another retry, and RETRYFF is active indicating that this operation needs to be retried.

PAUSE to IDLE: If T_RETRY_B is active and RETRYFF is inactive, this transition will immediately be made. The message has been completely sent.

WRITE to SEND: Write is one clock state, and if the command was SND_ACK or SND_REQ, this transition will be made.

SEND to IDLE: The state machine will stay in this state until the SND_ACK and SND_REQ command signals are both off. This indicates that the IMP has recognized that the message word has been sent successfully.

Figure 5:
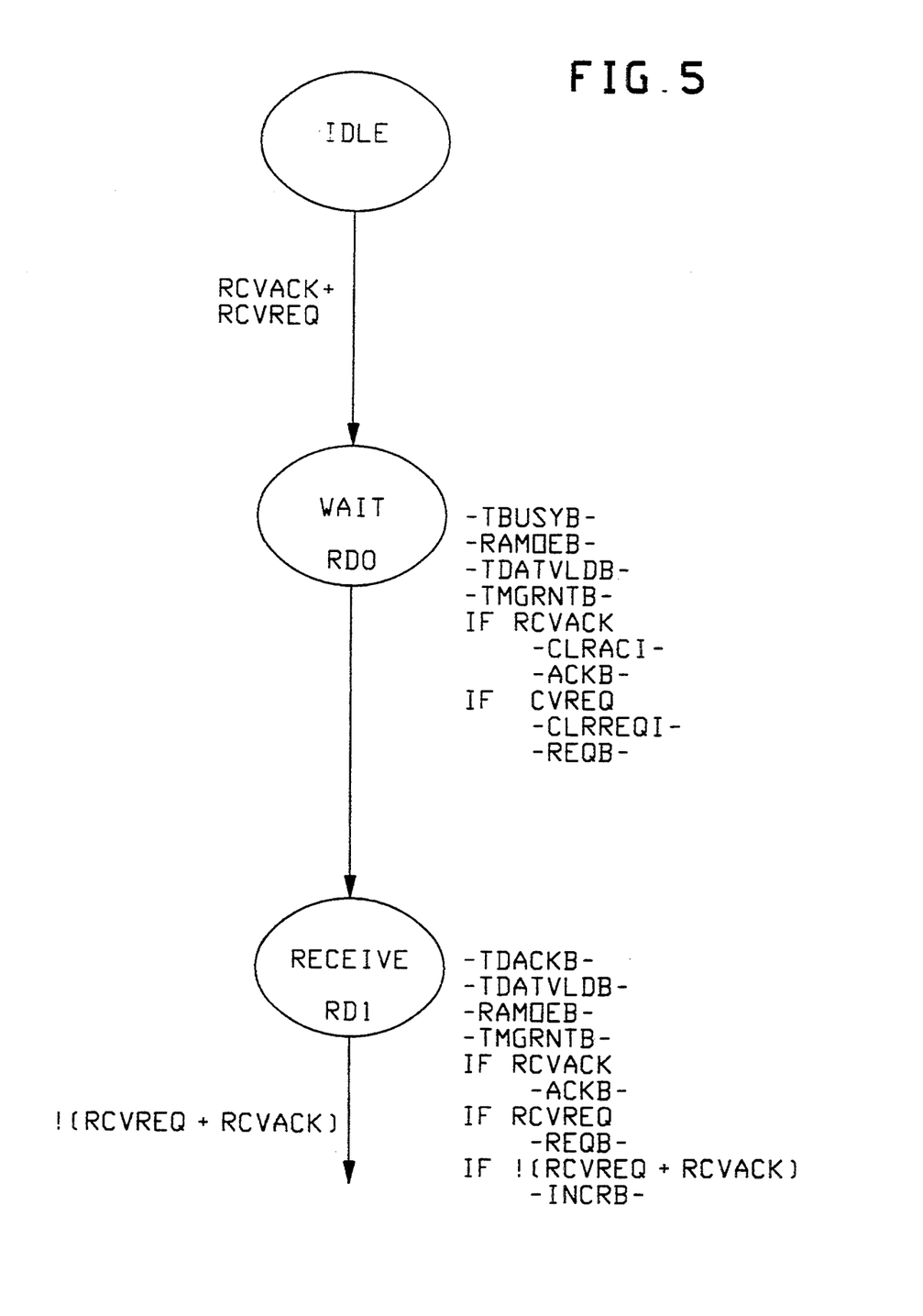
FIG. 5 is a schematic diagram showing the sequence of operations for the translator buffer unit state machine during a read operation.
Figure 6:
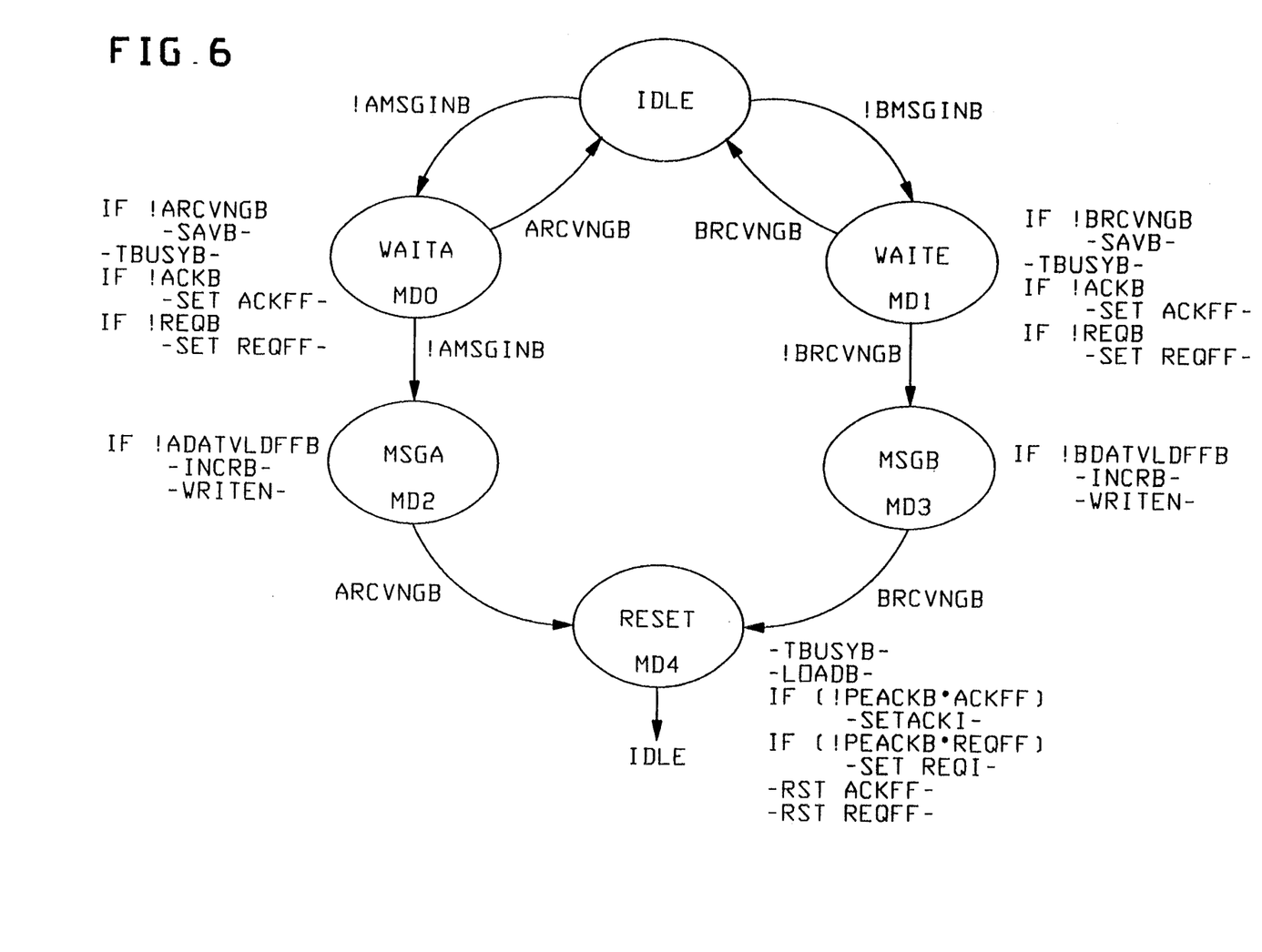

The READS State Machine (SM2) functions are shown in FIG. 5. The Reads state machine implements the logic to allow the IMP processor 6 to read messages one word at a time from the translator RAM 20.

The basic functions of Idle, Wait (RD0, FIG. 5) and Receive (RD1) can be indicated as follows:

IDLE The state machine enters this state when the Translator Unit 10 is reset and at the end of each operation.

WAIT (RD0) When a RCA_ACK or RCA_REQ command is received from the IMP processor 6, this state is entered. RAMOE_B is set active to allow the RAM 20 to drive the T_BUS. T_DATVLD_B DATVLD and T_MGRNT_B are set active to tell the IMP logic that valid data is being sent. If the command was RCA_ACK, then ACK_B is set active to cause the RAM 20 to address the acknowledge message address range. If RCA_REQ was the command, then REQ_B is set active to cause the RAM to address the acknowledge message address range. Internally, if the command is RCA_ACK, the ack interrupt flip-flop is reset so the interrupt is no longer set to the IMP processor 6. The request interrupt is active for only two clocks, so it need not be reset by this state machine.

RECEIVE (RD1) The outputs in this state are similar to the (RD1) wait state except that the ack interrupt is no longer being reset. In addition, when both the RCA_REQ and RCA_ACK command lines become inactive, INCR_B will become active for one clock to cause the translator counter 40 to increment to the next RAM 20 address.

The transitions between the conditions of Idle, Wait, and Receive in the Reads State Machine (SM2) may be summarized as follows:

IDLE to WAIT: When the RCA_ACK or RCA_REQ command becomes active, this transition is immediately made.

WAIT to RECEIVE: Wait is a one clock state and this transition will immediately be made.

RECEIVE to IDLE: When both RCA_REQ and RCA_ACK are inactive, indicating that the IMP processor 6 logic has received the message data from the translator controller 10, this transition is made.

FIG. 6 illustrates the functional states of the third state machine designated as the "message in" or MSGIN state machine.

The MSGIN state machine implements the logic to accept messages from the system busses 56 and 57 and to write them into the translator RAM 20. There are 6 states in this state machine as described below.

IDLE: The state machine enters this state when the Translator Controller 10 is reset, and at the end of each operation.

WAITA, WAITB These two states (designated MD0, MD1) are similar, WAITA entered if the message is being received on system bus A and WAITB entered if the message is being received on system bus B. If x_RCVNG_B becomes active, indicating the message has been accepted by the system bus interface logic, 50, SAVE_B will be driven active, telling the counter (PAL) 40 to save the address at which the IMP processor 6 will write to or read from the next RAM message word so it can be restored after the message has been received.

The small "x" in a signal name indicates two signals-:one for System Bus A and one for System Bus B (FIGS. 1A and 3). If the message is an "acknowledge message", the internal ACKFF is set and ACK_B is driven to the counter (PAL) 40 to tell it which address range to use. If the message is a "request message", the REQFF is set and REQ_B is driven to the counter (PAL) 40 to tell it which address range to use. These two internal flip-flop's are set to recognize which type of message was sent later in the same sequence.

MSGA, MSGB Once again, these two states (MD2, MD3 of FIG. 6) are similar, MSGA entered if the message is being received on system bus A and MSGA entered if the message is being received on system bus B. If x_DATVLDFF_B is active, this indicates that valid message data is being received. WRITEN and INCR_B are both driven active, WRITEN to write the message data into the RAM 20 and INCR_B to increment the counter (PAL) 40 to the next address in the RAM 20.

RESET This state (MD4) is the final state when receiving messages. LOAD_B is driven active to cause the counter 40 to reassert the address bits it was asserting before the message came in. If x_PEACK_B becomes active, this indicates that the message was received unsuccessfully and ACKI_B can be set active to the IMP 6 if the message was an acknowledge, or REQI_B can be set active to the IMP 6 if the message was a request. Note that ACKI_B is active until the message is read by the IMP, while REQI_B is active for only two clocks. The internal ACKFF and REQFF are both reset. If x_PEACK_B is not active during this state, it indicates an error occurred when sending the message, and there is not a valid message in the RAM 20, so no interrupts to the IMP 6 will be set.

The major transitions which occur in FIG. 6 of the MSGIN State Machine are:

MSGIN State Transitions:

IDLE TO WAITA, WAITB: If the signal A_MSGIN_B becomes active the transition to WAITA will be made, and if B_MSGIN_B becomes active, the transition to WAITB will be made. These two input signals indicate that a message command has been detected on a system bus, but it is not yet known whether the system bus interface logic 50 will accept the message.

WAITA to MSGA, WAITB to MSGB: These transitions take place if A_RCVNG_B or B_RCVNG_B become active respectfully. These signals indicate that the system bus interface 50 logic has accepted a message from one of the system buses and it must be loaded into the translator controller 10.

WAITA to IDLE, WAITB to IDLE: If A_RCVNG_B is not active in the WAITA state or B_RCVNG_B is not active in the WAITB state, the appropriate transition will take place. This indicates that the system bus interface logic 50 did not accept the message.

MSGA, MSGB to RESET: When A_RCVNG_B or B_RCVNG_B become inactive in each case, this indicates that the message is no longer being sent, either because all words have been sent, or an error occurred during the transmission and it was not completely sent. In either case, this transition is made. The reset state determines whether the entire message was valid.

RESET to IDLE: The reset state is a one clock state and immediately transitions to IDLE.

DISCARD Bit: The discard bit is used by the IMP processor 6 to determine whether the pending message in the translator controller 10 can be discarded. It is read by doing the RCA_STA, or receive status, command. Data is returned active high on M_BUS(39), shown in FIG. 3.

The DISCARD bit is set if the IMP processor 6 is loading a request message to be sent to the TCU 70 anytime after the first request message is received from another system module. It is reset when an acknowledge or request message is first loaded into the translator controller 10 from the system bus, making this the new pending message which is now valid. It is also set when a request message is read by the IMP processor 6.

Translator RAM Addresses:

The RAM 20 uses 13 different addresses. The addresses are shown in Table I. The outgoing messages and the incoming request and acknowledge messages all occupy four addresses each. The outgoing command word uses one address. When a command word is written to or read from the RAM 20, CMD_B is forced low by the Translator controller 10 to the counter 40. When an acknowledge message is being written or read, ACK_B is forced low by the Controller 10 to the counter 40. When a request message is being written or read, REQ—B is driven low by the Controller 10 to the counter 40.

TABLE I

| RAM ADDRESSES | MESSAGE WORDS |
| --- | --- |
| 0000 | Outgoing Word 1 |
| 0001 | Outgoing Word 2 |
| 0010 | Outgoing Word 3 |
| 0011 | Outgoing Word 4 |
| 0100 | Outgoing Cmd Word |
| 1000 | Ack Word 1 |
| 1001 | Ack Word 2 |
| 1010 | Ack Word 3 |
| 1011 | Ack Word 4 |
| 1100 | Req Word 1 |
| 1101 | Req Word 2 |
| 1110 | Req Word 3 |
| 1111 | Req Word 4 |

Translator Controller (10) Test Bit:

The controller 10 contains a test bit CNTR—TSTOUT, which when active high will cause the counter 40 to increment between 0000B and 1111B when the IMP reads or writes from the RAM 20. This test is used to verify that the IMP can read and write all addresses used in the RAM 20.

In FIG. 3, the translator counter 40 has a series of input signal lines which are described below. The counter 40 is a circuitry combination of Programmable Array Logic (PAL).

The Counter PAL 40 is implemented in a Signetics PLUS405 device running at 16 MHz. Its purpose is to provide the four least significant address bits to the RAM when reading and writing message data. It also implements a test mode when CNTR—TSTOUT is active whereby sixteen addresses can be written to and read from in sequential order. These addresses are shown in Table I.

When the words of a message are being written or read by the IMP processor 6, the sequencing of the counter is controlled by the INCR—B signal from the Controller 10. If a message is being received off one of the system buses, it is also controlled by this signal. The particular system bus the message is being received from, is determined by looking at A—RCVNG—B. When a message is being sent, the PAL looks for SX—BGNTX—B with a validating X—BUSBUSY—B and then immediately starts sequencing. It will stop sequencing when X—PENRDY—B becomes active, the count reaches three, or the Controller 10 sends RSTCNT—B.

If the translator controller 10 is being loaded by the IMP processor 6 and, in between write operations, a message comes from a system bus, the current loading count will be stored within the counter PAL 40 while the message is received. This saving action is done when the SAVE—B signal is asserted from the Controller 10. It will be reasserted with the LOAD—B signal after the message has been received.

The Counter PAL 40 has Input signals in FIG. 3 which are described below:

Increment Counter (INCR—B): This signal from the Controller 10 causes the Counter PAL 40 address to increment by one.

A Side Receiving Message (A—RCVNG—B): This signal from the system bus interface 50 indicates that a message is currently being received off of system bus A. It is used to determine which system bus an incoming message should be sourced from.

Acknowledge Message (ACK—B): This signal from the Controller 10 causes the Counter PAL 40 to address the acknowledge message portion of the RAM, addresses 1000B-1011B. It becomes active while loading an acknowledge message from a system bus or while the IMP processor 6 is reading an acknowledge message word.

Request Message (REQ—B): This signal from the Controller 10 causes the Counter PAL 40 to address the request message portion of the RAM, addresses 1100B-1111B. It becomes active while loading a request message from a system bus or while the IMP processor 6 is reading a request message word.

Command Word (CMD—B): This signal from the Controller 10 causes the Counter PAL 40 to address the command word portion of the RAM, address 0100B. It becomes active while the IMP is writing the command portion of the message to the Controller 10 or while the Controller 10 is sending the command word to the system bus.

Save Counter Value (SAVE—B): If, while the IMP Processor 6 is reading or writing message words from the Translator Unit 15, a message must be loaded from the system bus, this signal causes the counter PAL 40 to save the present RAM address. It is sourced from the Controller 10.

Load Old Counter Value (LOAD—B): This signal causes the PAL to reassert the RAM address saved with the SAVE—B signal. It is sourced from the controller.

Reset Counter (RSTCNT—B): When this signal becomes active the Counter PAL 40 will reset its address to 00B. This is done at the end of a send message operation. It is sourced from Controller 10.

TBOX Message Out (TBXMSG—OUT): This signal indicates that the Translator Controller 10 is currently sending a message to the system bus. It is used to validate a system bus grant so the Counter PAL 40 knows it should start incrementing. It is sourced from the Controller 10.

System Bus Grant (Sx—BGNTX—B): This signal, validated with x—BUSBUSY—B indicates that the requested Central Processor Machine (CPM) has been granted the indicated system bus for a bus operation. It is used by the Counter PAL 40 to start incrementing the RAM address when sending out a message.

System Bus Busy (x—BUSBUSY—B): This signal indicates that there is an active bus operation occurring on its system bus. It is used to validate Sx—BGNTX—B. It is sourced from the system bus interface, 50.

Processing Element Not Ready (x—PENRDY—B): If the Counter PAL is sending a message, this signal being active will cause the PAL to stop incrementing until the signal is no longer active. It is sourced from the system bus interface, 50.

Counter Test Bit (CNTR—TSTOUT): This signal is used for testing. When the signal is active, translator read and write commands from the IMP 6 will cause the Counter PAL to increment between 0000B and 1111B rather than 00B and 11B. It is sourced from the controller, 10.

Signal lines of the Counter PAL 40 are shown in FIG. 3 on bus 42 marked CNT (3.0) to provide the RAM Address Bits (CNT3, CNT2, CNT1, CNT0). These bits are used to address the RAM 20.

In summary, the preceding disclosure discloses the operation of the specialized Translator Buffer System which is used to allow the passing of messages between a specialized processor (IMP Processor 6) and either a Task Control Unit module 70 or an Input/Output Unit module 60. The translator system allows the IMP processor to write messages one word at a time while sending messages to the other modules in four word bursts. The external modules such as the Input/Output Unit and the Task Control Unit can send messages to the IMP processor in four word bursts while the IMP processor can read these messages one word at a time to fulfill its internal operating requirements. It can also determine whether incoming messages should be discarded.

Additionally, the translator system not only makes the different message length word transfers compatible but also renders compatible the different clock rates in the communicating modules. Further the system recognizes messages as being requests or acknowledge types and determines whether an incoming message should be discarded in favor of a call request by the Central Processor Module (CPM).

While the described embodiment presents an illustrative example of the invention, it should be understood that other embodiments may fall within the scope of the invention as defined in the following claims.

GLOSSARY OF TERMS (a) EXTERNAL CALLS:

These are request messages from the processor (CPM) to other system modules. These are only transmitted by the processor and not received by the processor.

(b) EXTERNAL REQUESTS:

These are requests to the processor (CPM) from other system modules. These are only received by the processor (CPM) and not transmitted.

(c) ACKNOWLEDGES:

These are messages which are responses from other system modules to previously sent requests. Acknowledges can be transmitted by or received by the processor (CPM).

(d) BUS CYCLE:

A cycle on a system bus starting with a valid Command Word and ending after all data words have been transmitted. A typical message bus cycle is 5 clock cycles.

(e) CLOCK CYCLE:

A single time period from the first positive pulse rise to the next succeeding positive pulse rise. The IMP processor operates at a 12 MHZ rate while the IOU and TCU operate at a 16 MHZ rate.

(f) SCC—SYSTEM CONTROL AND CONFIGURATION SUBSYSTEM:

Interface between maintenance subsystem and CPM, Memory, I/O Module, and TCU.

(g) SU—STORAGE UNITS:

These would be memory modules.

(h) CPM—CENTRAL PROCESSOR MODULE:

A system card containing the IMP processor, Translator Unit and System Bus Interface.

(i) MIU—MEMORY INTERFACE UNIT:

Allows I/O Unit and TCU Unit to communicate with all CPM and Memory Units.

(j) TCU—TASK CONTROL UNIT:

Controls which tasks the processors work on.

(k) CMU—CHANNEL MANAGER UNIT:

Unit which controls all channel adapters.

(l) CA—CHANNEL ADAPTER:

A unit which allows the system to interface to outside peripherals by being able to adapt protocols of outside devices.

(m) DISCARDING:

When a request (received by the IMP processor) is received from the TCU (while an external call from the IMP processor to the TCU is being accumulated in the translator unit) this request will be discarded or eliminated.

(n) OUTPUT BUFFER:

The location of 5 addresses in Translator RAM 20 in which an outgoing message from a CPM is assembled this consists of once command word and four data words.

(o) REQUEST BUFFER:

The 4 locations in RAM 20 where an incoming request message is stored.

(p) ACKNOWLEDGE BUFFER:

The 4 locations in RAM 20 where an incoming acknowledge message is stored.

(q) TRANSLATOR UNIT:

The Logic Unit which enables two different systems with two message protocols to communicate.

(r) IOU—INPUT/OUTPUT UNIT:

The unit which controls communication between computer peripherals.

(s) STATE MACHINE:

A processor for controlling a prescribed set of routines within its environment.

(t) INTER OPERATOR INTERRUPT:

This is a signal to the IMP processor to stop operations and comes from Request Messages being delivered to the IMP processor.

(u) ACKNOWLEDGE INTERRUPT:

This is also called an Immediate Interrupt. This provides immediate interrupt to the IMP processor as a result of the acknowledge message. The acknowledge interrupt is monitored by the IMP processor microcode since, after the processor sends an External Call, it remains "idle" while waiting for an acknowledgement.

(v) MESSAGE CYCLE:

The time period starting when the Translator Controller 10 requests use of a System Bus from the Interface Logic 50 until an acknowledge is received from the destination module.

Also: The time period to transfer 4 words (4 Words ×48 bits/word=192 bits) from the TCU to the RAM 20. It may be noted that each word is = to 6 bytes or 48 bits.

What is claimed is:

1. A message transfer system for accommodating message transfers between digital units operating on different message protocols comprising:

(a) processor means , operating at a first clock rate, for sending and receiving message data at a rate of one single 48-bit word message per message cycle;

(b) resource means, operating at a second clock rate, for sending and receiving message data at a rate of four 48-bit word messages per message cycle;

(c) translation means connecting said processor means and said resource means and including:

(c1) means for accumulating and converting said processor derived single word messages into four 48-bit word messages for delivery to said resource means;

(c2) means for accumulating said resource derived 48-bit word messages for delivery to said processor means at a rate of one single 48-bit word message per message cycle;

(c3) translator controller means for regulating the transfer of said word messages between said processor means and said means for accumulating processor derived single word messages, and for regulating the transfer of words between said resource means and said means for accumulating resource derived 48-bit word messages, and including:

(c3a) message status register means, for indicating to said processor means, that a request from said processor means is still incomplete;

(d) dual system bus means providing first and second busses connecting said translation means to said resource means wherein each one of said busses operates concurrently to facilitate data transfers and wherein any one of said busses alone can provide data transfer operations if the other bus is disabled.

2. The message transfer system of claim 1 wherein said translator means further includes:

(a) said translator controller means providing connections to a programmable array logic counter means, a translator static RAM memory means, and to said processor means and resource means, said controller means comprising:
(1) a first state machine (SENDS) for accepting said single 48-bit word messages sent by said processor means for storage in said translator static RAM memory means;
(2) a second state machine (READS) providing logic to enable said processor means to read compatible messages of said single 48-bit word messages;
(3) a third state machine (MSGIN) providing logic to permit said resource means to compatibly write said four 48-bit word messages into said translator static RAM memory means;

(b) said programmable array logic counter means for addressing and accessing said single 48-bit and said four 48-bit word messages from said translator static RAM memory means;

(c) said translator static RAM memory means for connecting said processor means and said resources means while operating under control of said first, second and third state machines and said programmable array logic counter means and providing said means for accumulating said single 48-bit word and said four 48-bit word messages.

3. A message transfer system for accommodating message transfers between digital units operating on different message protocols and different clock rates comprising:

(a) first digital means for sending and receiving message data using one single 48-bit word message per message transfer cycle, said first digital means using an "x" MHz clock rate;

(b) second digital means for sending and receiving message data using a four 48-bit word message per message transfer cycle, said second digital means using a "y" MHz clock rate;

(c) translation means connecting said first digital means and said second digital means and including:
(c1) means for receiving message data derived from said first digital means for compatible delivery to said second digital means;
(c2) means for receiving said four 48-bit word messages from said second digital means for compatible delivery to said first digital means;
(c3) wherein said means for receiving message data from said second digital means includes:
(c3a) dual system bus means providing a first and second duplicate redundant bus for data transfer operations;
(c4) means to discard a request for word message transfer from said second digital means when said first digital means has a request for word message transfer uncompleted and still pending to said second digital means, said means including:
(c4a) a message status register which indicates the status of each request for word transfer as being completed or still incomplete.

* * * * *